United States Patent
Kosuda et al.

[11] Patent Number: 6,028,836
[45] Date of Patent: Feb. 22, 2000

[54] OPTICAL RECORDING MEDIUM FOR USE AT SHORT WAVELENGTHS AND ITS RECORDING METHOD

[75] Inventors: Atsuko Kosuda; Shuji Tsukamoto, both of Nagano; Masahiro Shinkai, Chiba; Toshiki Aoi, Nagano, all of Japan

[73] Assignee: TDK Corporation, Tokyo, Japan

[21] Appl. No.: 09/182,417

[22] Filed: Oct. 30, 1998

[30] Foreign Application Priority Data

Nov. 5, 1997 [JP] Japan ..................... 9-319027
Mar. 20, 1998 [JP] Japan ..................... 10-092849

[51] Int. Cl.$^7$ ..................... G11B 7/24
[52] U.S. Cl. ..................... 369/275.1; 369/275.4; 369/112
[58] Field of Search ..................... 369/275.1, 275.3, 369/275.4, 13, 109, 110, 116, 112, 288, 59, 48, 54, 44.26; 430/19, 270.13, 945; 428/694 ML, 694 EC, 694 MM

[56] References Cited

U.S. PATENT DOCUMENTS 5,481,530 1/1996 Ueda et al. ..................... 369/275.1
5,888,680 3/1999 Ohbayashi et al. ..................... 430/19

FOREIGN PATENT DOCUMENTS 9-81966 3/1997 Japan.

*Primary Examiner*—Ali Neyzari
*Attorney, Agent, or Firm*—Oblon, Spivak, McClelland, Maier & Neustadt, P.C.

[57] ABSTRACT

An optical recording medium adapted for high density recording with a light of short wavelength which exhibits excellent jitter properties, and its recording method are provided. The optical recording medium recorded and/or reproduced with a light at a wavelength of 600 to 680 nm comprises a substrate having grooves formed on its surface at a track pitch of up to 0.8 μm, and a recording layer containing an organic die disposed on the substrate. Depth A and width B of the groove (μm) and leveling ratio C are in the relation:

$0.035 \leq A \times B \leq 0.06$, and $2 \leq C/A \leq 3.5$ when the leveling ratio C is represented by the following formula (I):

leveling ratio=[thickness of the recording layer on the groove (μm)–thickness of the recording layer on the land (μm)]/[depth of the groove (μm)]

5 Claims, 1 Drawing Sheet

OPTICAL RECORDING MEDIUM FOR USE AT SHORT WAVELENGTHS AND ITS RECORDING METHOD

BACKGROUND OF THE INVENTION

1. Field of the Invention

This invention relates to an optical recording medium which has a recording layer comprising a dye film, and a method for overwriting such medium. More specifically, this invention relates to an optical recording medium which can be recorded and reproduced with a light of a short wave length (600 to 680 nm), and a method for overwriting such medium.

2. Prior Art

A recording method of an optical recording medium which has gone into actual use is heat mode recording method wherein a laser beam is directed to the recording layer as heat source to induce evaporation, decomposition or the like in the recording layer to thereby form concave pits which are detectable by an optical means.

A wavelength in the vicinity of 780 nm is used in such method for the recording and the reproduction, and use of a light with shorter wavelength is required to fulfill the need of the higher density recording.

With the progress in the recording/reproduction using a laser of shorter wavelength, reading out the information that has been recorded with the conventional laser wavelength of approximately 780 nm by a reproduction system using a laser with a short wavelength of about 630 to 680 nm, and vice versa are now required. In other words, there is a need for compatibility between the recording/reproduction at the conventional wavelength and the recording/reproduction at a shorter wavelength.

Such recording/reproduction of the optical medium at a higher density and use of a laser beam with a shorter wavelength also requires change in the type of the organic dye in the recording layer and change in the groove configuration.

Japanese Patent Application Kokai No. (JP-A) 81966/1997 discloses an optical recording medium wherein a U-shaped groove with a depth of 140 to 200 nm and width of up to 0.40 λ/NA μm (λ is wavelength of the recording laser beam, and NA is numerical aperture of the laser beam focusing lens) is used for the guide groove. In the investigation of the inventors of the present invention, however, the recording and reproducing properties of this medium has been insufficient.

SUMMARY OF THE INVENTION

An object of the present invention is to provide an optical recording medium with a track pitch of up to 0.8 μm which is adapted for recording/reproduction at a wavelength of 600 to 680 nm and which exhibits excellent jitter properties.

Another object of the present invention is to provide a recording method for such recording medium.

Other objects of the present invention will be appreciated from the description of the present invention.

The objects as described above are realized by the present invention as described in (1) to (4), below.

(1) An optical recording medium recorded and/or reproduced with a light at a wavelength of 600 to 680 nm comprising a substrate having grooves formed on its surface at a track pitch of up to 0.8 μm and a recording layer containing an organic die disposed on the substrate, wherein A×B is in the range of 0.035 to 0.06 and C/A is in the range of 2 to 3.5 when A is depth of the groove (μm), B is width of the groove (μm), and C is leveling ratio which is represented by the following formula (I):

leveling ratio=[thickness of the recording layer on the groove (μm)−thickness of the recording layer on the land (μm)]/[depth of the groove (μm)]

(2) The optical recording medium according to the above (1) wherein thickness of the recording layer on the land is up to 0.15 μm.

(3) The optical recording medium according to the above (1) wherein, when the recording is conducted by pulse dividing the recording signal, length $T_{top}$ of the top pulse of the pulse train and the groove depth A (μm) are in the relation such that $A \times T_{top}$ is in the range of 0–15 to 0.25.

(4) A method for recording the optical recording medium according to any one of the above (1) to (3) wherein the recording is conducted by pulse dividing the recording signal, and length $T_{top}$ of the top pulse of the pulse train and the groove depth A (μm) are in the relation such that $A \times T_{top}$ is in the range of 0.15 to 0.25.

DETAILED DESCRIPTION OF THE INVENTION

Next, the present invention is described in further detail.

The optical recording medium of the present invention has a track pitch of up to 0.8 μm, is recorded and/or reproduced at a short wavelength of 600 to 680 μm, and is adapted for high density recording.

Figure 1:
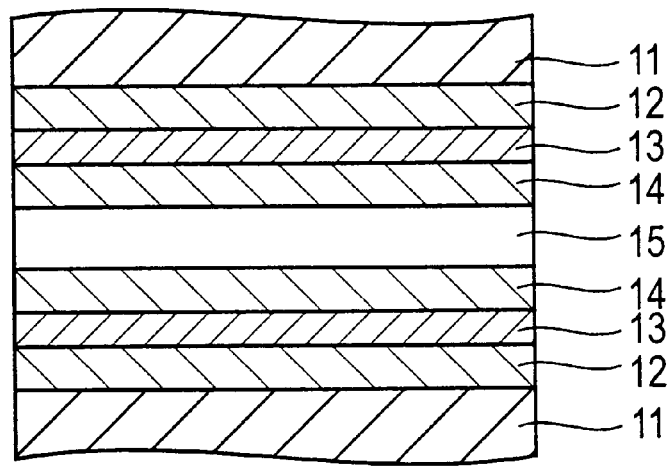
FIG. 1 is a partial cross-sectional view of an embodiment of the optical recording medium according to the present invention.

An embodiment of such optical recording medium is shows in FIG. 1. As shown in FIG. 1, the optical recording disc (the optical recording medium) is prepared from two discs each comprising a substrate 11, a recording layer 12, a reflective layer 13, and a protective layer 14 in this order. The discs are bonded to each other with the protective layer 14 in the inside by means of an adhesive layer 15. The substrate 11 which is typically a polycarbonate substrate has a thickness of 0.6 mm, and has a groove formed on its surface. The adhesive layer has a thickness of about 10 to 200 μm, and comprises a hot melt adhesive, a UV adhesive of slow curing type, a pressure-sensitive adhesive sheet, or the like. In FIG. 1, the layers are schematically illustrated, and grooves are not depicted.

In such optical recording medium, an optical recording medium having excellent recording/reproduction properties can be prepared by selecting an optimal configuration for the groove provided for the purpose of tracking servo and an optimal leveling ratio for the recording layer.

More illustratively, in the optical recording medium having the substrate provided with the groove having a death of A (μm) and a width of B (μm) and the recording layer disposed on the substrate to a leveling ratio of C as defined by the formula (I) below, the groove and the recording layer are provided to meet the conditions:

$0.035 \leq A \times B \leq 0.06$, and more preferably, $0.04 \leq A \times B \leq 0.05$; and $2 \leq C/A \leq 3.5$, and more preferably, $2.3 \leq C/A \leq 2.8$.

Formula (I):

Leveling ratio C=[thickness of the recording layer on the groove $D_G$ ($\mu$m)−thickness of the recording layer on the land $D_L$ ($\mu$m)]/[depth of the groove A ($\mu$m)]

The optical recording medium satisfying such conditions exhibits good balance between reflectance and degree of modulation as well as excellent jitter properties. In contrast, degree of modulation will be insufficient when A×B is less than 0.035, and the jitter properties and the reflectance will be deteriorated when A×B is in excess of 0.06. The degree of modulation will be also insufficient when C/A is less than 2, and the jitter properties will be unfavorable when C/A is in excess of 3.5.

Figure 2:
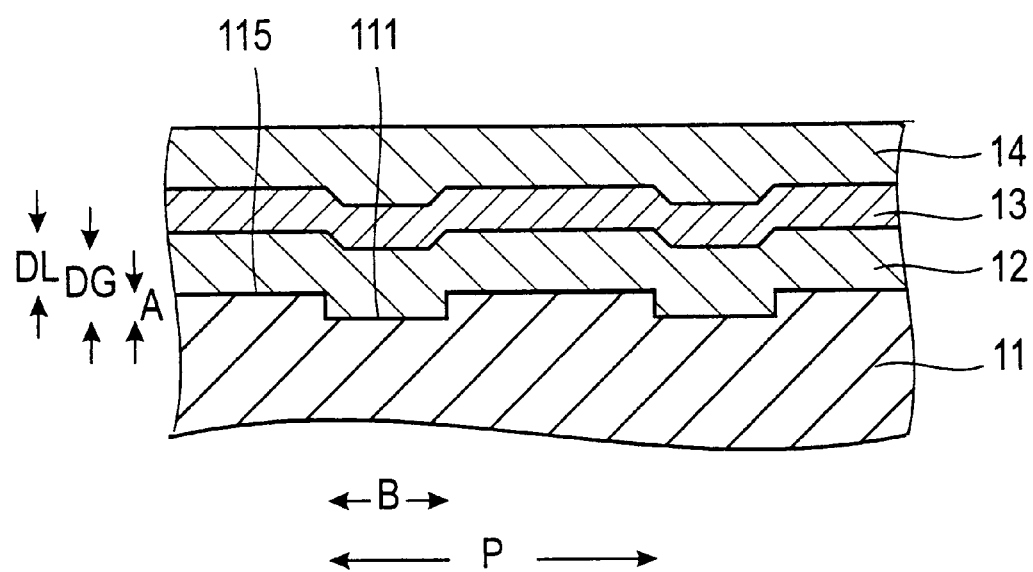
FIG. 2 is a partial cross-sectional view of the optical recording medium for explaining the constitution of the optical recording medium of FIG. 1.

FIG. 2 is a schematic view of one side of the optical recording disc, and there is depicted the substrate 11 formed in its surface with the groove, the recording layer 12, the reflective layer 13, and the protective layer 14. FIG. 2 may be referred for the depth A and the width B of the groove, thickness of the recording layer on the groove $D_G$, and thickness of the recording layer on the land $D_L$.

It should be note that the configuration of the groove is not limited to the one shown in FIG. 2 wherein the width of the groove is constant through its depth. For example, the groove may have a larger width on the upper side (on the side of protective layer 14) and a smaller width on the bottom side, and in such a case, the width B is the width at half its depth. The thickness of the recording layer on the groove $D_G$ and thickness of the recording layer on the land $D_L$ are the average values of at least 5 points in the recording area of the disc.

The optical recording medium of the present invention is described in further detail by referring to FIGS. 1 and 2.

The substrate 11 is a disc shaped substrate with the size of about 120 mm in the diameter and 0.6 mm in the thickness fabricated from a resin or a glass substantially transparent to the recording and reproducing lights (which is preferably a laser beam having a wavelength of about 600 to 680 nm, more preferably 630 to 680 nm, and most preferably 635 to 650 nm) to thereby enable the recording and the reproduction from the rear side of the substrate 11. The substrate 11 may preferably have a transmittance to such recording/reproducing light of at least 88%.

In the surface of the substrate 11 on which the recording layer 12 is deposited is formed a groove 111 for the purpose of tracking servo as shown in FIG. 2. The groove 111 is preferably a continuous groove having a depth A of 0.12 to 0.2 $\mu$m and a width B of 0.25 to 0.45 $\mu$m provided in spiral manner at a track pitch (groove pitch) P of up to 0.80 $\mu$m, and preferably 0.65 to 0.80 $\mu$m. Provision of the groove in such constitution enables to attain a fine tracking signal without detracting from the reflectance level. In contrast, degree of modulation is insufficient when the groove has a depth of less than 0.12 $\mu$m, and formation of the groove having a depth in excess of 0.2 $\mu$m is difficult and impractical in technical point of view and such groove will suffer from poor mechanical accuracy. A groove having a width in excess of 0.45 $\mu$m is likely to invite cross talk, and hence, increased jitter, and it is difficult to obtain the tracking signal of sufficient intensity from a groove having a width of less than 0.25 $\mu$m and slight off set of the tracking during the recording is likely to invite increase in jitter and insufficient degree of modulation. It is also difficult to obtain sufficient degree of modulation from the groove having a width of less than 0.25 $\mu$m.

The substrate is preferably fabricated from a resin material, and more preferably, from a thermoplastic resin such as a polycarbonate, a (meth)acrylate resin, an amorphous polyolefin, a TPX, a polystyrene resin or the like by a known process such as injection molding. The groove 111 is preferably formed simultaneously with the molding of the substrate 11. The groove, however, may be formed after the production of the substrate 11 by depositing a resin layer having groove 111 therein by means of 2P method or the like.

The recording layer 12 disposed on the substrate 11 contains an organic dye, and is formed by using a coating solution containing the organic dye preferably by spin coating. The spin coating may be conducted in accordance with the ordinary method from the inside to the outside of the disc at a rotation of 500 to 5000 rpm.

The thus formed recording layer 12 may preferably have a thickness $D_L$ on the land 115 of the substrate 11 of up to 0.15 $\mu$m, more preferably up to 0.1 $\mu$m, and most preferably in the range of 0.03 to 0.1 $\mu$m; and a thickness $D_G$ on the groove 111 of the substrate 11 determined by the formula: $D_L+(2 \text{ to } 3.5) A^2$.

By regulating the thickness of the recording layer 12 as described above, the resulting optical recording medium will have a favorable recording/reproducing properties. When the recording layer has a thickness outside the above-specified range, the favorable reproduction of the optical recording medium will be difficult, and in particular, thickness $D_L$ of the recording layer 12 on the land 115 in excess of the above-specified range will invite cross talk, and hence, increase in the jitter.

In the present invention, the medium is recorded by groove recording.

The complex refractive index of the recording layer 12 at the wavelength of the recording light and the reproducing light is such that the real part n is in the range of 2.0 to 2.8 and the imaginary part k is up to 0.4.

Control of the n and k to the above-specified ranges enables recording and reproduction at a favorable level. Sufficient reflectance is not obtained when k is in excess of 0.4, and signal degree of modulation is insufficient when n is less than 2.0. In view of the situation of the dye compound synthesis, nonlimited typical upper limit of n is about 2.8.

n and k of the recording layer is determined by preparing test samples by depositing the recording layer to a thickness of, for example, about 40 to 100 nm on the predetermined transparent substrate under the conditions used in actual production, and measuring the reflectance through the substrate of the sample and the reflectance from the side of the recording layer. In such a case, the reflectance is measured for mirror reflection (about 5°) by using the wavelength of the recording/reproducing light (635 to 650 nm). n and k may be calculated from these measurements, for example, in accordance with pages 168 to 178 of Kozo Ishiguro, "Optics", Kvoritsu-Zensho.

Exemplary organic dyes which may be used in the present invention for the recording layer include cyanine dyes, metal complex dyes, styryl dyes, porphyrin dyes, azo dyes, formazan metal complexes, and rhodamine dyes.

The solvent used in the present invention for the coating of the recording layer may be adequately selected from alcohol solvents (including alkoxyalcohols such as ketoalcohols and ethylene glycol monoalkyl ethers), aliphatic hydrocarbon solvents, ketone solvents, ester solvents, ether solvents, aromatic solvents, halogenated alkyl solvents, and the like. Content of the organic dye in the coating solution is generally in the range of 0.05 to 10 wt %. The coating solution may contain a binder, a dispersant, a stabilizer and the like as desired.

As shown in FIGS. 1 and 2, a reflective layer 13 is disposed on and in direct contact with the recording layer 12.

The reflective layer 13 may preferably comprise a metal exhibiting high reflectance such as Au, Pt, Cu, Al, Ag or an alloy thereof. The reflective layer 13 may be deposited by such means as vapor deposition or sputtering preferably to a thickness of 50 nm (500 Å) or more. The thickness of the reflective layer 13 is preferably up to about 120 nm (1200 Å) in view of the cost and the time required for the layer deposition although there is no particular upper limit for the reflective layer 13. The reflectance of such reflective layer 13 alone will be at least 90%, and such reflectance is sufficient as the reflectance through the substrate for the unrecorded part of the medium.

As shown in FIGS. 1 and 2, a protective layer 14 is disposed on the reflective layer 13. The protective layer 14 may be prepared from a resin material such as UV curable resin to a thickness of about 0.5 to 100 $\mu$m. The protective layer 14 may be in the form of a laminate or a sheet, and may be formed by a conventional method such as spin coating, gravure coating, spray coating, dipping or the like.

The optical recording medium 1 of such constitution may be recorded or added-on by directing a recording light at a wavelength of 635 nm to 650 nm in pulse mode through the substrate 11 and changing the reflectance of the irradiated area. When the medium is irradiated with the recording light, the recording layer 12 absorbs the light, and the recording layer 12 as well as the substrate 11 are heated. As a consequence of such temperature elevation, the organic dye and other components constituting the recording layer near the boundary between the recording layer 12 and the substrate 11 undergoes melting and decomposition to exert pressure on the boundary between the recording layer 12 and the substrate 11. Such pressure often resulted in the deformation of the groove in its bottom and side surfaces.

In the present invention, when the optical recording medium is recorded by pulse dividing the recording signal and using the pulse train, length $T_{top}$ of the top pulse of the pulse train (divided pulses) and the groove depth A ($\mu$m) are in the relation such that A×$T_{top}$ is preferably in the range of 0.15 to 0.25, and more preferably in the range of 0.18 to 0.22, and use of an optical recording medium and a recording method which satisfy such conditions is preferred. When such conditions are fulfilled, the reproduced signals will exhibit favorable jitter properties. In contrast, A×$T_{top}$ of less than 0.15 is likely to result in poor recording sensitivity and unfavorable jitter properties. A×$T_{top}$ in excess of 0.25 also results in unfavorable jitter properties.

It should be noted that $T_{top}$ is preferably in the range of 1.15 to 1.4T.

Accordingly, $T_{top}$ is defined by using T as one unit. The T used for describing the $T_{top}$ is defined by the following formula:

[minimum pit length (length corresponding to 3T; unit: nm)/3]/linear velocity (unit: m/s)=T (unit: ns)

The length of the second and the following pulses is in the range of 0.6 to 0.7T, and interval between such pulses is in the range of 0.3 to 0.4T. The medium is preferably recorded and reproduced at a linear velocity (CLV) in the range of 3 to 20 m/s, and more preferably in the range of 3 to 12 m/s.

EXAMPLE

Example of the present invention is given below by way of illustration and not by way of limitation.

Example 1

A disc shaped substrate having a diameter of 120 mm and a thickness of 0.6 mm was prepared from polycarbonate, and a groove shown in Table 1 was formed in one major surface of the substrate. On such grooved surface of the substrate, there were formed a recording layer of the thickness shown in Table 1 by spin coating a 1.0 wt % 2,2,3,3-tetrafluoropropanol solution containing the organic dyes as described below; a Au reflective layer of 100 nm thick by a sputtering; and a transparent protective layer (layer thickness 5 $\mu$m) comprising a UV curable acrylic resin. Two discs were prepared as described above, and the discs were adhered to each other with an adhesive such that the protective layer is on the interior of the resulting disk (see FIG. 1). The samples as shown in Table 1 were thereby produced.

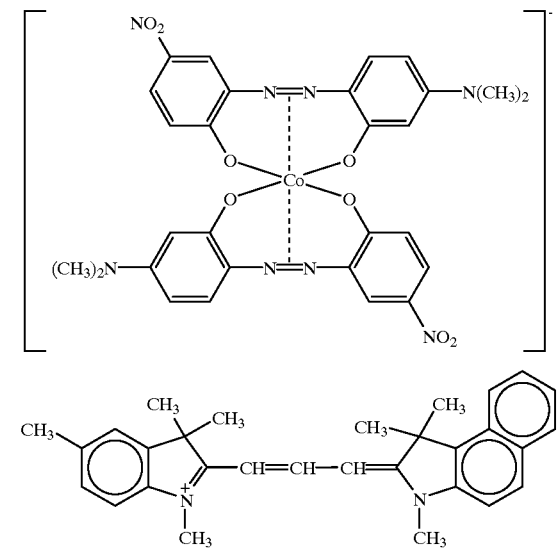

TABLE 1

| Sample No. | Track pitch P ($\mu$m) | Groove Depth A ($\mu$m) | Groove Width B ($\mu$m) | Thickness of recording layer on Groove $D_G$ ($\mu$m) | Thickness of recording layer on Land $D_L$ ($\mu$m) | Leveing ratio | A × B | C/A | Recording signal $T_{top}$ (T) | A × $T_{top}$ |
|---|---|---|---|---|---|---|---|---|---|---|
| 1 | 0.8 | 0.14 | 0.3 | 0.129 | 0.080 | 0.35 | 0.042 | 2.50 | 1.3 | 0.182 |
| 2 | 0.8 | 0.16 | 0.26 | 0.125 | 0.059 | 0.4 | 0.042 | 2.50 | 1.25 | 0.200 |
| 3 | 0.8 | 0.12 | 0.35 | 0.142 | 0.100 | 0.35 | 0.042 | 2.92 | 1.4 | 0.168 |
| 4* | 0.8 | 0.12 | 0.35 | 0.173 | 0.121 | 0.45 | 0.042 | 3.75 | 1.4 | 0.168 |
| 5* | 0.8 | 0.14 | 0.3 | 0.150 | 0.080 | 0.5 | 0.042 | 3.57 | 1.4 | 0.196 |

TABLE 1-continued

| Sample No. | Track pitch P (μm) | Groove Depth A (μm) | Width B (μm) | Thickness of recording layer on Groove $D_G$ (μm) | Land $D_L$ (μm) | Leveing ratio | A × B | C/A | Recording signal $T_{top}$ (T) | A × $T_{top}$ |
|---|---|---|---|---|---|---|---|---|---|---|
| 6* | 0.8 | 0.18 | 0.35 | 0.139 | 0.080 | 0.33 | 0.063 | 1.83 | 1.4 | 0.252 |
| 7* | 0.8 | 0.16 | 0.26 | 0.130 | 0.082 | 0.30 | 0.042 | 1.88 | 1.25 | 0.200 |

*Comparison

Signals were recorded on the thus prepared samples by directing a laser beam of 638 nm at a linear velocity (CLV) of 3.8 m/s. Next, the signals were reproduced by directing a laser beam of 638 nm at a linear velocity (CLV) of 3.8 m/s to evaluate various properties.

The recording signals were pulse divided, and the top pulse of the pulse train had a length $T_{top}$ as shown in Table 1, and the second and the following pulses had a length of 0.7T and a pulse interval of 0.3T. The numerical aperture (NA) of the lens was 0.6. The properties evaluated were reflectance at 638 nm, degree of modulation (14T Mod), jitter, and optimal recording power ($P_0$) at 638 nm.

The results are shown in Table 2.

TABLE 2

| Sample No. | A × B | C/A | Thickness of recording layer on land $D_L$ (μm) | A × $T_{top}$ | Reflectance (%) | Degree of modulation (%) | Recording sensitivity (mW) | Jitter (%) |
|---|---|---|---|---|---|---|---|---|
| 1 | 0.042 | 2.50 | 0.080 | 0.182 | 43.50 | 61 | 8.9 | 8.4 |
| 2 | 0.042 | 2.50 | 0.059 | 0.200 | 44.00 | 66 | 9.3 | 7.5 |
| 3 | 0.042 | 2.92 | 0.100 | 0.168 | 45.00 | 62 | 8.7 | 9.0 |
| 4* | 0.042 | 3.75 | 0.121 | 0.168 | 44.00 | 60 | 8.4 | 12.0 |
| 5* | 0.042 | 3.57 | 0.080 | 0.196 | 44.50 | 69 | 8.4 | 11.5 |
| 6* | 0.063 | 1.83 | 0.080 | 0.252 | 36.00 | 63 | 8.6 | 11.0 |
| 7* | 0.042 | 1.88 | 0.082 | 0.200 | 32.50 | 62 | 8.3 | 10.0 |

*Comparison

As shown in Table 2, the discs of the present invention have particularly improved jitter properties.

It should be noted that Sample No. 6 for the purpose of comparison was prepared in accordance with Example 1 of JP-A 81966/97. The Sample No. 6 was inferior to the samples of the present invention in the reflectance as well as in the jitter.

Merit of the Invention

The optical recording medium provided by the present invention has well-balanced reflectance and degree of modulation, high recording sensitivity, and excellent jitter properties. The optical recording medium of the present invention can be used in establishing an improved recording method.

JP-A 319027/1997 and JP-A 92849/1998 are incorporated herein by reference.

Although some preferred embodiments have been described, many modifications and variations may be made thereto in the light of the above teachings. It is therefore to be understood that, within the scope of the appended claims, the invention may be practiced otherwise than as specifically described.

What is claimed is:

1. An optical recording medium recorded and/or reproduced with a light at a wavelength of 600 to 680 nm comprising a substrate having grooves formed on its surface at a track pitch of equal to or less than 0.8 μm and a recording layer containing an organic dye disposed on the substrate, wherein A×B is in the range of 0.035 to 0.06 and C/A is in the range of 2 to 3.5 when A is depth of the groove (μm), B is width of the groove (μm), and C is leveling ratio which is represented by the following formula (I):

leveling ratio=[thickness of the recording layer on the groove (μm)−thickness of the recording layer on the land (μm)]/[depth of the groove (μm)]

2. The optical recording medium according to claim 1 wherein thickness of the recording layer on the land is equal to or less than 0.15 μm.

3. The optical recording medium according to claim 1 wherein, when the recording is conducted by pulse dividing the recording signal, length $T_{top}$ of the top pulse of the pulse train and the groove depth A (μm) are in the relation such that A×$T_{top}$ is in the range of 0.15 to 0.25.

4. A method for recording an optical recording medium comprising recording with light at a wavelength of 600 to 680 nm and conducting the recording by pulse dividing the recording signal, and length $T_{top}$ of the top pulse of the pulse train and the groove depth A (μm) are in the relation such that A×$T_{top}$ is in the range of 0.15 to 0.25, wherein said optical recording medium comprises a substrate having grooves formed on its surface at a track pitch of equal to or less than 0.8 μm and a recording layer containing an organic dye disposed on the substrate, wherein A×B is in the range of 0.035 to 0.06 and C/A is in the range of 2 to 3.5 wherein A is as defined above, B is width of the groove (μm), and C is leveling ratio which is represented by the following formula (I):

leveling ratio={thickness of the recording layer on the groove (μm)−thickness of the recording layer on the land (μm)}/{depth of the groove (μm)}.

5. The method of claim 4, wherein thickness of the recording layer on the land is equal to or less than 0.15 μm.

* * * * *